July 6, 1965    P. LAAKMANN    3,193,823
METHOD AND APPARATUS FOR DETECTING MOTION
Filed March 28, 1961    2 Sheets-Sheet 1

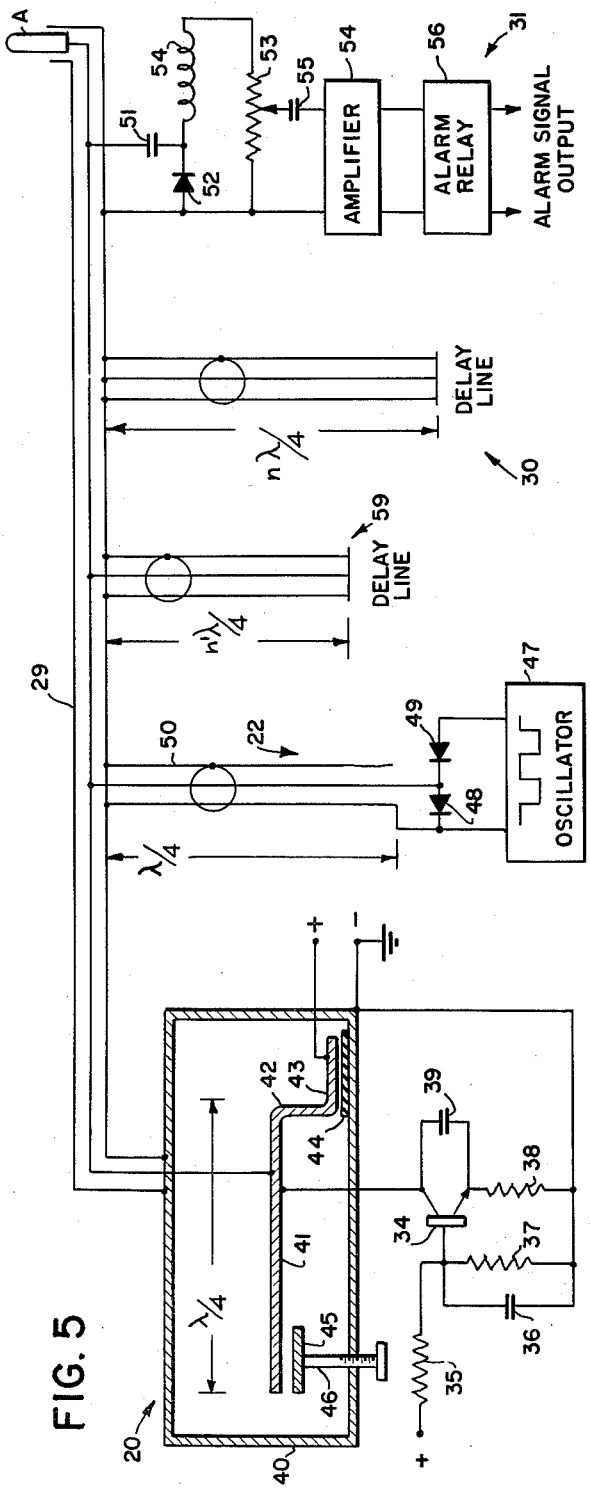

United States Patent Office 3,193,823
Patented July 6, 1965

3,193,823
METHOD AND APPARATUS FOR
DETECTING MOTION
Peter Laakmann, Staten Island, N.Y., assignor to American District Telegraph Company, Jersey City, N.J., a corporation of New Jersey
Filed Mar. 28, 1961, Ser. No. 98,957
8 Claims. (Cl. 343—7)

The present invention relates to a method and apparatus for detecting motion and more particularly to a method and apparatus for establishing a field of radiant energy, using said radiant energy to detect motion and limiting the space in which said energy is effective to detect motion.

Various systems have been suggested and used for detecting the motion of burglars or other intruders in a protected space by filling such space with radiant energy. Such systems have been basically of two types, namely, those using electromagnetic energy and those using sonic energy.

The electromagnetic systems have generally used microwave frequencies. Examples of such systems are given in United States Patents 2,247,246 to Lindsay and Woloschak issued June 24, 1941, and 2,826,753 to Chapin issued March 11, 1958.

The sonic energy systems have generally used frequencies in the ultrasonic range, e.g., frequencies of the order of 20,000 cycles per second. Examples of such systems are given in United States Patents 2,655,645 to Bagno issued October 13, 1953, 2,769,972 to MacDonald issued November 6, 1956, and 2,972,133 to MacDonald issued February 14, 1961.

Both the electromagnetic and sonic energy systems have been subject to limitations which have seriously hampered the use thereof in providing electrical protection and especially electrical protection of rooms and other enclosures. Thus the electromagnetic energy, by its nature, is not confined by the walls, doors and windows of a building, but a substantial proportion of such energy passes to the space outside the protected enclosure and may be affected by motion outside the protected enclosure and hence produces false alarms. A particular problem in this regard has been encountered in connection with the motion of motor vehicles outside the protected enclosure. In an effort to prevent or limit the penetration of energy outside the protected enclosure, various means have been employed such as lining walls with metal foil to prevent passage therethrough of electromagnetic energy. While in some cases this expedient may be tolerable, in most installations it is impractical. More practical has been the expedient of severely reducing the system sensitivity. But it often happens that with system sensitivity set so that a truck or other motor vehicle passing outside the protected premises will not initiate an alarm, the sensitivity will be too low to insure detection of a human being moving within the protected enclosure.

Ultrasonic systems are not subject to the same disability since the sonic energy is effectively confined by the walls of the enclosure. But ultrasonic systems operate on the basis of motion, and air turbulence can often produce false alarms. Thus blower heaters, air conditioning systems, and even wind acting through loose windows can and do produce false alarms in ultrasonic systems. Again, sensitivity of ultrasonic systems must usually be reduced below the most desirable level to limit false alarms to a tolerable rate.

The principal object of the invention has been to provide a novel and improved method and apparatus for detecting motion.

A specific object of the invention has been to provide a novel and improved method and apparatus for detecting motion by means of electromagnetic energy and in which the energy is confined within the space to be protected.

Another object of the invention has been to provide a novel and improved microwave space protection system which may be operated at a high level of sensitivity without substantial danger of spurious alarms.

While the invention finds its greatest utility in connection with the use of electromagnetic energy, certain principles thereof are applicable also to sonic energy systems and accordingly another specific object of the invention has been to provide a novel and improved sonic energy space protection system.

Other and further objects, features, and advantages of the invention will appear more fully from the following description of illustrative embodiments thereof taken in connection with the appended drawings, in which:

FIG. 4 is a block diagram illustrating a modification of FIG. 3;

FIG. 5 is a schematic diagram illustrating one form of circuit arrangement embodying the invention;

FIGS. 7 and 7A are graphs of sensitivity time versus distance corresponding to the pulse wave shapes of FIGS. 6 and 6A, respectively.

Figure 2:
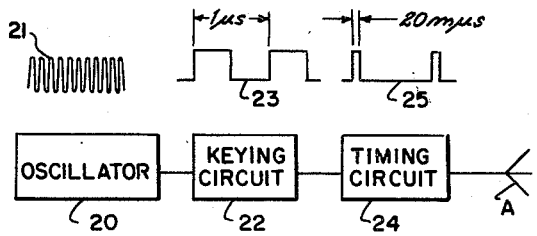
FIG. 2 is a block diagram illustrating the basic apparatus for producing the operation of FIG. 1.

Referring now to the drawings, and more particularly to FIG. 2, oscillator 20 may be of any suitable type to produce a stable microwave signal, e.g., a signal having a frequeny in the range of 400–5000 megacycles. This signal is suggested at 21 in FIG. 2. The signal 21 is supplied to a keying circuit 22 to produce a pulse train 23 having a relatively short repetition rate such as 1 microsecond. The pulses each actually represent an envelope for a large number of cycles of the microwave signal. The pulse train 23 is supplied to an antenna A through a timing circuit 24 which allows energy to be radiated by antenna A for only a very short interval at the start of each of the pulses, e.g., 20 millimicroseconds. The signal supplied to antenna A is indicated at 25 and consists of a succession of 20 millimicrosecond pulses having a repetition rate of one microsecond.

Figure 1:
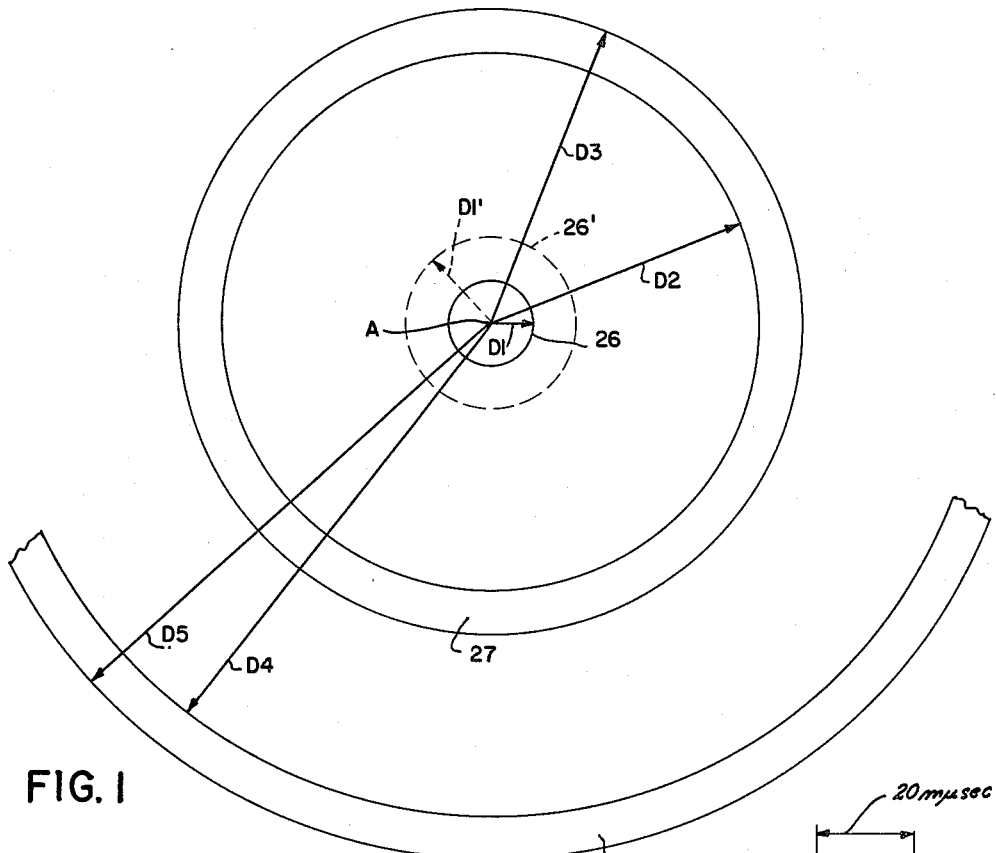
FIG. 1 is a diagram illustrating the basic operation of the invention.

Referring now to FIG. 1, antenna A will radiate energy starting at zero time and continuing for 20 m$\mu$ seconds and, assuming, for convenience, a circular radiation pattern, at the end of 20 m$\mu$ seconds the radiation will fill a space bounded by a circle 26' having a radius D1'. The effective area filled by radiation is a space bounded by a circle 26 whose radius is D1, where D1 is one-half of D1'. Thus while radiation will penetrate beyond circle 26 to a distance D1' by the end of 20 m$\mu$ seconds, since the energy must be reflected back to the antenna to result in detection of motion, only that energy radiated during the first half of the 20 m$\mu$ second interval will be effective at the maximum range. Hence the effective radius D1 is one-half the actual distance D1' traversed by the energy first transmitted at the start of the 20 m$\mu$ second interval.

At the end of the 20 m$\mu$ second interval, no further energy will be radiated until one $\mu$ second after zero time, whereupon energy will be radiated for a second 20 m$\mu$ second interval. At the start of the second 20 m$\mu$ second interval, the energy radiated during the first interval will have reached a circle whose radius is D2, and at the end of the second 20 m$\mu$ second interval, the energy radiated during the first interval will fill an effective annular space 27 bounded by circles whose radii are D2 and D3, where $D3-D2=D1$. At the end of a third 20 m$\mu$ second radiation interval, the energy formerly in the space 27 will fill an effective annular space 28 bounded by circles whose radii are D4 and D5, where $$D5-D4=D3-D2=D1$$

The radius D1 may be computed as follows:

$$(1) \qquad D1=\frac{vt}{2}$$

where $v$ is the velocity of propagation in air ($3\times10^8$ meters/second) and $t$ is the interval of propagation ($2\times10^{-8}$ second).

The factor of 2 is involved in Equation 1 since, as mentioned above, the effect of motion on the radiated energy must be reflected back to the antenna during the energy radiating interval and hence only energy radiated during the first half of the interval can result in detection of motion at a distance D1 from the antenna. Thus:

$$(1) \qquad D1=\frac{vt}{2}=\frac{2\times10^{-8}\times3\times10^8}{2}=3 \text{ meters}$$

The radii D2 and D4 may similarly be computed, taking as the time $t$ the values of 1 and 2 microseconds, respectively. Thus D2 equals 300 meters and D4 equals 600 meters.

It will be evident that during any of the short time intervals during which energy is being radiated from antenna A, energy radiated during previous intervals is located in discrete annular rings located at multiples of 300 meters from antenna A. It is convenient to use the energy located within the space bounded by circle 26 to detect motion of intruders within this circle, and the sensitivity of detection may be made as high as necessary without danger of false alarms resulting from motion at any place outside the circle 26. This will be evident when it is considered that during any detection interval there is no radiated energy outside the circle 26 until a distance of approximately 300 meters is reached (actually this distance at the start of the radiating interval is $D2-D1$ or 300—3 equals 297 meters and becomes 300 meters at the end of the interval). Energy which extends beyond the radius D1 to the radius D1' during the radiation interval may be neglected since any of such energy reflected back to the antenna will not reach the antenna before the end of the radiation interval. In view of the intensities of radiation involved, and in view of the dissipation of this energy as the square of the distance, motion at a distance of 300 meters would have virtually no effect on the detecting system, or at least so little effect as to be negligible.

The operation described affords a protected space formed by a circle whose radius is the distance travelled by electromagnetic energy in air during one-half the radiation interval, e.g., 3 meters. Protection is actually afforded to a volume since energy is also propagated in the vertical direction. The shape of the area of protection need not be circular but may be adjusted by selecting an antenna with appropriate characteristics. Similarly, the antenna characteristics can be selected also to accommodate the height of the room or other space to be protected. Location of the antenna with respect to the dimensions of the protected space and with respect to the characteristics of the antenna also facilitates affording protection of the desired space without penetration of energy into adjacent spaces where motion is likely to result in false alarms. It is not suggested that the effective field of energy can be made to coincide exactly with the shape and size of the space being protected except in exceptional circumstances. However, in most instances, by proper selection of the antenna, proper location of the antenna and proper selection of the radiation interval, the effective field of energy can be confined to the space being protected together with minor outside areas where motion likely to produce false alarms is not likely to occur.

The maximum dimension of the field of protection (measured from the antenna) is adjusted as desired by selecting the time duration of the radiating interval. As mentioned above, a time duration of 20 millimicroseconds yields a dimension of 3 meters. A time duration of 10 millimicroseconds would yield a dimension of 1.5 meters, while a time duration of 40 millimicroseconds would yield a dimension of 6 meters. A time duration of one microsecond would yield a dimension of 150 meters, which would be of interest for purposes of affording a fence or barrier (as will be discussed hereinafter), but would generally be of little significance in the protection of rooms or other indoor spaces.

The selection of the oscillator frequency and particularly setting the range of preferred frequencies at 400 megacycles or higher is based upon the fact that better operation is achieved at higher frequencies, since the motion of an intruder within the protected space will have a greater effect on the energy at high frequencies (short wavelengths). Setting the preferred upper limit at 5000 megacycles is based upon the difficulty of achieving higher frequencies with a stable oscillator of reasonable cost. 5000 megacycles represents approximately the highest frequency which can be achieved at the present time with a stable oscillator using ordinary solid state components. A device such as a magnetron could be used to achieve still higher frequencies, but the cost at the present time would be virtually prohibitive for protection purposes. Should economical and reliable means of producing higher frequencies become available, some advantage would accrue from practicing the principles of the invention at such higher frequencies.

Figure 3:
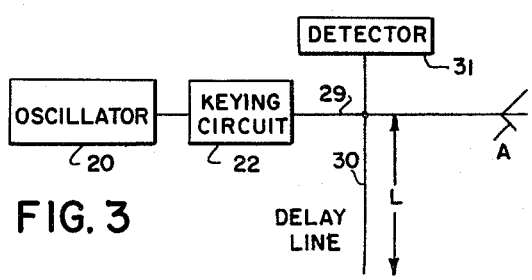
FIG. 3 is a block diagram illustrating in somewhat greater detail the apparatus of FIG. 2.

In accordance with a further aspect of the invention, timing of the radiation interval, e.g., 20 millimicroseconds, may be carried out by supplying a portion of the oscillator output energy to a delay line and using the output of the delay line to prevent further propagation of energy from the antenna. Referring to FIG. 3, the pulse train output of the keying circuit 22, which might be pulses of one microsecond repetition rate, are supplied to antenna A over a transmission line 29, preferably a coaxial cable. The cable 29 should be matched to the antenna as is customary at high frequencies. A transmission line 30, also preferably a coaxial cable, is connected to the line 29 at an intermediate point, preferably closely adjacent the antenna. A detector 31 is connected to the cable 29 and serves to detect changes in energy reflected back to the antenna A.

The length of the line 30 and its termination are selected to provide a short circuit of the line 29 at a time after commencement of each pulse equal to the desired radiation interval. Thus, if the cable 30 be open circuited at its end, the length L should be an odd number of quarter wavelengths. The length L may be determined from the equation:

$$(2) \qquad L=\frac{vt}{2}$$

where $v$ is the velocity of propagation of the energy along the cable 30 and $t$ is the desired radiation interval, e.g., 20 millimicroseconds.

The velocity of propagation of an electromagnetic wave along a coaxial cable is less than the velocity in free space by a factor depending on the dielectric constant of the cable insulation. In the case of solid stabilized polyethylene, the velocity $v$ is equal approximately to 0.67 times the velocity of light, or approximately $2\times10^8$ meters per second. Thus, for a 20 m$\mu$ second radiation interval, the required length for the delay line 30 would be:

$$(2) \qquad L=\frac{vt}{2}=\frac{2\times10^8\times2\times10^{-8}}{2}=2 \text{ meters}$$

But it is also required that the length of the delay line 30 be an odd integral number of quarter wavelengths.

Assuming a frequency (f) of 400 megacycles, the wavelength in the coaxial cable suggested above is:

(3) $$\lambda = \frac{v}{f} = \frac{2 \times 10^8}{4 \times 10^8} = 0.5 \text{ meter}$$

so that a quarter wavelength is equal to 0.125 meter. In a length of 2 meters, there would then be 16 quarter wavelengths. But for an open circuited delay line 30, an odd number of quarter wavelengths is needed to produce a short circuit at the junction of cables 29 and 30. Thus the cable 30 should be either 15 or 17 quarter wavelengths long or 1.875 meters or 2.125 meters long. Selecting 2.125 meters, the actual radiation interval would be changed from 20 mμ seconds to (4) $$t = \frac{2L}{v} = \frac{2 \times 2.125}{2 \times 10^8} = 21.25 \text{ m}\mu \text{ seconds}$$

The resulting dimension D1 is given by (1) $$D1 = \frac{vt}{2} = \frac{3 \times 10^8 \times 2.125 \times 10^{-8}}{2} = 3.187 \text{ meters}$$

which is little changed from the 3 meters computed for a radiation interval of 20 mμ seconds.

If desired, the delay line 30 might be short circuited at its end and made an integral number of half wavelengths long. Since a half wavelength is 0.25 meter for the example assumed above, a 2 meter delay line would be eight half wavelengths long and hence would yield a radiation interval of 20 mμ seconds.

It has been assumed that the delay line 30 was lossless in stating that the delay line 30 would effect a cessation of energy transmission from antenna A at the end of the radiation interval. Of course, some losses will occur in the delay line, but these may in many cases be ignored for practical purposes. However, if it should be desired to compensate for the attenuation loss, a delay line as shown in FIG. 4 may be used.

In FIG. 4 the delay line 32 is preferably a coaxial cable, but both ends are connected to the coaxial cable 29. The points of connection of the cable 32 to the cable 29 are separated by a variable attenuator 33, which is shown as a variable resistor but actually should provide reactive as well as resistive attenuation, and might be, for example, a short length of lossy cable. The length L of the cable 32 is given by the equation:

(5) $$L = vt$$

and for the example assumed in connection with FIG. 3, (5) $$L = vt = 2 \times 10^8 \times 2 \times 10^{-8} = 4 \text{ meters}$$

The loss in the delay line 32 may be calculated from the propagation constant γ which is given by the equation $$\gamma = \alpha + j\beta$$

where α is the attenuation constant and β is the phase constant. In practice, the attenuator 33 will be adjusted to match the losses in line 32 by selecting a setting such that substantially complete suppression of the energy supplied to antenna A is achieved at the end of the radiation interval.

Referring now to FIG. 5, the oscillator 20 comprises a transistor 34. The positive biasing potential for the transistor 34 is supplied to the base thereof through a resistor 35. The biasing circuit also includes a capacitor 36 and a resistor 37 coupled in parallel between the base of transistor 34 and ground and a resistor 38 connected between the emitter of transistor 34 and ground. A capacitor 39 is provided for regenerative coupling between the collector and emitter of transistor 34. The oscillator tank circuit is enclosed within a metal box 40 which is connected to ground potential. A metal strip 41 is spaced from the bottom of box 40 by an upstanding leg 42 and has a base 43 affixed to an insulating strip 44 which may be made of mica and which is in turn affixed to the bottom of box 40. The length of strip 41 between its free end and the leg 42 is equal to or less than one-quarter wavelength at the desired oscillator frequency, e.g., 400 megacycles. A disc 45 carried on a threaded screw 46 is positioned adjacent the free end of strip 41 and affords an adjustable capacitance for fine tuning of the tank circuit. The screw 46 acts in a threaded hole provided in the bottom of box 40 and turning of screw 46 alters the spacing between strip 41 and disc 45 and hence alters the capacitance therebetween. Positive operating potential for the collector of transistor 34 may be supplied to the latter through connection to strip 41 as shown. The transistor 34 and other oscillator circuit elements can conveniently be mounted within the box 40 to provide a compact package and to avoid long leads which are undesirable at high frequencies.

The center conductor of coaxial cable 29 is connected to the oscillator tank circuit, as by connection to strip 41, to supply oscillatory energy from oscillator 20 to antenna A. The outer conductor of coaxial cable 29 is grounded to box 40.

As explained previously, the high frequency output of oscillator 20 may be keyed at a relatively slow rate to provide output pulses of relatively long duration. For example, keying may be accomplished at a frequency of one megacycle to provide pulses having a period of one microsecond. The keying may be accomplished in any convenient way but should be effected in a manner as not to affect the stability of oscillator 20.

A convenient and effective keying circuit is afforded by providing an oscillator 47, which might be a relaxation oscillator or other type of oscillator which has an output wave shape having a very steep leading edge, as in a square wave. The output of oscillator 47 is supplied to series connected rectifiers 48 and 49. The rectifier 48 is connected between the center and outer conductors of a coaxial cable 50, the length of which is a quarter wavelength at the output frequency of oscillator 20. When rectifier 48 is conductive, which occurs for a half cycle of each cycle of the output signal of oscillator 47, the impedance of rectifier 48 is very low and may be considered practically a short circuit across the coaxial cable 50. On the other hand, when rectifier 48 is not conductive, which condition prevails during the other half cycles of the output signal of oscillator 47, the rectifier 48 presents a high impedance between the inner and outer conductors of coaxial cable 50. Since a quarter wavelength line reflects the opposite of its terminating impedance, a short circuit at the end of cable 50 appears as an open circuit at the junction of cables 50 and 29, and hence cable 50 has virtually no effect on the signal appearing on cable 29. But, for the other half cycles during which rectifier 48 is not conducting, the high impedance termination of cable 50 acts effectively as a short circuit between the center and outer conductors of cable 29 at the junction of cables 29 and 50. Hence transmission of high frequency energy from oscillator 20 along cable 29 will be interrupted during alternate half cycles of the output of oscillator 47. If oscillator 47 operates at one megacycle, the high frequency energy output of oscillator 20 is keyed at a one megacycle rate and the "on" pulses of high frequency energy have a repetition rate of one microsecond and a duration of about one-half microsecond.

The pulses transmitted past cable 50 are further keyed by delay line 30 to provide a pulse duration corresponding to the desired radiation interval, as previously described. For a maximum dimension of three meters between antenna A and the edge of the detecting field, this radiation interval should be 20 mμ seconds.

Energy radiated by antenna A during the first half of the radiation interval contacts objects in the protected space and energy is reflected back to antenna A from these objects. If the object happens to be moving with a component of motion in the direction of the antenna, the frequency of the reflected energy will be altered, i.e., the reflected energy will suffer a Doppler shift. This alteration is an increase in frequency for objects moving toward the antenna and a decrease in frequency for objects moving away from the antenna.

The reflection of energy from a moving object to the antenna A may also be considered as causing increases or decreases in the signal intensity at antenna A and in cable 29 caused by reflected energy reinforcing or cancelling transmitted energy. Changes in reflected energy resulting from motion of an object in the effective field thus can be considered as causing a change in amplitude of the oscillatory energy present in antenna A and cable 29. This phenomenon can also be considered as a change in radiation resistance resulting from motion. It will be appreciated that it is immaterial whether motion of objects be considered as producing a Doppler shift and consequent phase or frequency modulation, a change in signal amplitude or a change in radiation resistance, since these are merely different ways of characterizing the same physical phenomenon.

Changes in high frequency energy in cable 29 are detected in detector 31 and used to produce an alarm signal output. Detector 31 comprises a capacitor 51 and a rectifier 52 connected in series between the center and outer conductors of coaxial cable 29. The rectified output voltage appears across a potentiometer 53, a choke coil 54 being provided to suppress high frequency voltages.

Under steady state conditions, i.e., with no detected motion producing changing reflected energy, which in turn produce modulation components in the high frequency energy in cable 29, a steady D.C. voltage will be produced across potentiometer 53. When motion in the protected space produces changes in this high frequency energy, corresponding changes will be produced in the D.C. voltage across potentiometer 53. These changes in D.C. voltage across potentiometer 53 are supplied to an amplifier 54 through a coupling capacitor 55 which serves to block the steady state D.C. voltage. The amplified output of amplifier 54 is supplied to alarm relay 56. The alarm relay may be a balanced relay which will transfer to alarm condition upon an increase or decrease in the amplifier output above or below predetermined values.

The illustrated detector circuit is of a very simple type and more sophisticated detector circuits may be used, for example, circuits of the type shown in the Lindsay and Woloschak patent and in the MacDonald patent, both mentioned previously.

The detector is shown coupled near the antenna, but it could be coupled to the oscillator tank circuit or at any point along the cable 29. However, an improved signal to noise ratio is achieved by coupling the detector to the coaxial cable between the delay line 30 and the antenna A. Thus, if the detector receives high frequency energy constantly from the oscillator but receives a signal only during the radiation interval, the noise energy will be greater than if high frequency energy from the oscillator is supplied to the detector only during the same time that a signal is supplied thereto.

If the detector is coupled to the line at the antenna, the protected radius D1 is given directly by Equation 1. But if the detector is coupled to the line in advance of the antenna, the protected radius begins at the location of the detector, since the electromagnetic wave travels along the line at a finite velocity. This velocity is approximately $0.67c$ for a polyethylene insulated coaxial cable. Thus, if the detector is located any appreciable distance from the antenna, the protected radius will be decreased. For example, if the detector is located two feet from the antenna, the protected radius measured from the antenna will be shortened by three feet from the value given by Equation 1, since the time required for electromagnetic energy to travel three feet in air is equal to the time required for such energy to travel two feet in a polyethylene insulated coaxial cable.

This effect affords a convenient means for selecting different protected radii for the individual antennas in multiple antenna installations. Thus, if two or more spaced antennas are supplied with energy from the same source and with the same radiation internal, the effective protected radius of the respective antennas may be made different by using different antenna-detector spacings for the individual antennas. This may be considered as adjusting the radiation interval for each of the antennas so that each antenna has a radiation interval selected to limit detection to a respective protected space.

Figure 6:
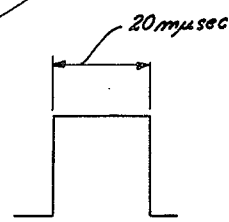
FIGS. 6 and 6A are pulse wave shapes for explaining the operation of FIG. 5.

FIG. 6 shows the pulse shape for the energy supplied to antenna A during the radiation interval for the system of FIG. 5 as so far described. Considering FIGS. 1 and 7, it will be evident that sensitivity of the system to motion of an object located at a distance one-half D1 from antenna A will be much greater than the system sensitivity to motion of an object located at or near distance D1 because radiation which can be reflected back to antenna A during the radiation interval will impinge on an object located at one-half D1 for a greater time than for an object located at or near D1. Indeed, an object exactly at distance D1 will receive such effective radiation for only a vanishingly short time. This relationship is illustrated by FIG. 7, which shows that the sensitivity to motion considered as a function of the effective time of exposure to radiation varies linearly but inversely with the distance from the antenna, becoming zero at D1. FIG. 7 ignores the drop in radiation intensity which decreases as the square of the distance, but this drop in intensity would only reinforce the decrease in sensitivity with distance from the antenna.

Figure 6A:
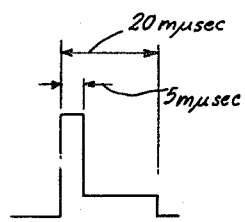

In accordance with a further aspect of the invention, substantially uniform sensitivity as a function of distance from the antenna can be provided, again ignoring the drop in sensitivity due to decrease in signal intensity with distance. This is accomplished by restricting the time during which high amplitude energy is transmitted to a first portion of the radiation interval and then transmitting only low amplitude energy for the remainder of the radiation interval. The pulse shape corresponding to this type of operation is shown in FIG. 6A. Thus, in FIG. 6A for a first portion of the total radiation interval the antenna A transmits radiation at an intensity which may be the same as in FIG. 6. But at the end of this first period the amplitude drops to a low level insufficient to afford any substantial detection sensitivity but sufficient to afford mixing with reflected energy to provide modulation components for detection. For example, if the radiation interval be 20 m$\mu$ seconds, the high amplitude first portion of the radiation interval might be 5 m$\mu$ seconds.

Since a pulse having a 5 m$\mu$ second duration will afford 5 m$\mu$ seconds of radiation exposure to most of the protected space, the sensitivity characteristic will be approximately that shown by the curve 57 in FIG. 7A, which is a close approximation to the ideal sensitivity characteristic shown by the dashed curve 58.

A pulse shape of the type shown in FIG. 6A may be achieved by providing an additional delay line 59 in the system of FIG. 5. The delay line 59 is preferably a coaxial cable and the factors influencing its construction and arrangement are similar to those factors discussed in connection with delay line 30 (or delay line 32), except that the length of line 59 is selected to provide a time delay corresponding to the desired first portion of the radiation interval, e.g., 5 m$\mu$ seconds, and also that complete cancellation of the signal on line 29 is not desired. Thus, whereas line 30 should ideally be lossless, line 59 should have some losses or, alternatively, its length should be slightly different from an exact odd multiple of a quarter wavelength or multiple of a half wavelength, as the case may be. In FIG. 5 the length of line 59 is designated as $n'\lambda/4$ to differentiate from the length designation of $n\lambda/4$ for line 30.

By using appropriate antennas, a wide variety of field configurations may be achieved to accommodate desired protected spaces. By use of an appropriate antenna and reflector, a radiation pattern which forms a relatively narrow and relatively tight beam can be achieved. Such a beam will be useful in certain situations such as detecting motion in a street, or alley, or in a confined aisle, or any other narrow path where motion of an intruder is constrained to be generally in the direction of the antenna.

The principles of the invention when applied to microwave energy overcome the major problem encountered in the use of electromagnetic energy in detecting intruders, i.e., the penetration of that energy outside the space for which protection is desired so that motion detected outside of such space can result in false alarms. In systems using sonic energy, this problem does not exist since at the frequencies and amplitudes employed the walls, windows and other parts of a building or room quite effectively prevent leakage of the detected energy. However, the invention is useful in such systems where it is desired to protect a limited space which is not bounded by walls. Such a space might be indoors or outdoors, but the use of ultrasonic protection outdoors is greatly complicated by problems of air turbulence. An example of an applicable use of the invention in an ultrasonic system would be the protection of a small space in a large room where normal activity goes on in the room outside of the small space but no persons are supposed to enter the small space.

The problem of keying an ultrasonic system to provide limited effective field area is far simpler than the problem of keying a microwave system, since the velocity of sound is so much smaller than the velocity of light, the velocity of sound in air at sea level being 345 meters per second as compared to $3 \times 10^8$ meters per second for light. By way of example, to achieve a dimensional limitation of 3 meters with electromagnetic energy required a radiation interval of 20 millimicroseconds. To achieve the same limitation with ultrasonic energy would require a time of approximately 17 milliseconds. This figure of 17 milliseconds ignores the physical spacing between the transmitting transducer and receiving transducer commonly used in ultrasonic systems, and in determining the actual radiation interval in a practical application using spaced transducers this spacing would have to be taken into account. To provide electronic keying of a circuit such as that of the aforementioned MacDonald Patent 2,769,972, to achieve a radiation interval of the order of 17 milliseconds would not be difficult and might be accomplished, for example, by blocking one of the buffer amplifier tubes intercoupling the oscillator and the transmitting transducer except for 17 millisecond periods occurring at a suitable repetition rate.

In either an electromagnetic system or a sonic system the Doppler frequency shift resulting from motion of an intruder will be relatively small and considerable advantage accrues in providing a filter circuit in association with the detector to limit detection of frequency components outside of the range which results from motion of the type to be detected. Such a filter is shown, for example, in the aforementioned MacDonald patent, which suggests the use of a band pass filter in an ultrasonic system so that modulation frequency components outside a predetermined range will not produce an alarm signal.

Since the motion of an intruder results in a limited range of modulation frequency components, the space limiting aspects of the invention can be achieved by a shift in oscillator frequency at the end of the radiation interval rather than a suppression of energy transmission. Thus, if the oscillator frequency is altered at the end of the radiation interval from its normal value to a value sufficiently different as not to result in substantial signal detection, only energy radiated during the first half of the radiation interval will, upon reflection from a moving object, result in a detector output. Energy radiated after the end of the first half of the radiation interval and before the start of the next radiation interval will be suppressed by the filter circuit and will not result in an alarm signal output.

Such non-effective reflected energy will suffer a Doppler shift resulting from the motion of the reflecting object. But in the case of energy radiated during the second half of the radiation interval the energy at the antenna which mixes with the reflected energy will have been shifted in frequency so that modulation components will be outside the detector or detector-filter effective range. And as to energy radiated after the end of the radiation interval, the original base frequency thereof will have been shifted sufficiently that the filtering action will prevent effective generation of an alarm signal.

In the case of a microwave oscillator, frequency shift may be effected by changing the effective tuning frequency of the tank circuit under control of another oscillator having a suitable output wave shape and using the technique described in connection with keying delay line 22 and oscillator 47. Other frequency changing techniques will occur to those skilled in the art. In the case of an ultrasonic system, the usual operating frequency range is so low that frequency shift of the oscillator will present no problem to those skilled in the art.

While the invention has been described in connection with specific embodiments thereof and in connection with specific uses, various modifications thereof will occur to those skilled in the art without departing from the spirit and scope of the invention as set forth in the appended claims. The use of the term "radiant energy" in the appended claims is intended to include both electromagnetic energy and sonic energy, and the terms "object" and "moving object" are intended to include human beings, since it is such objects it is normally desired to detect.

What is claimed is:

1. Apparatus for detecting motion of an intruder in a predetermined limited space, comprising an oscillator arranged to produce an alternating current having a selected frequency, a transducer for converting said alternating current into radiant energy and arranged to transmit said radiant energy into said space, means intercoupling said oscillator and said transducer, keying means arranged periodically to suppress transmission of said radiant energy after a radiation interval of predetermined length, receiving and detecting means arranged to receive said radiant energy reflected from objects in said space, to mix said received energy and said transmitted energy and to detect modulation components in the mixed energy resulting from the Doppler shift in frequency produced by motion of an object in said space, and alarm signalling means coupled to said detecting means and arranged to produce an alarm signal upon detection of modulation components of predetermined level, said radiation interval being selected so that energy cannot be radiated, be reflected from an object substantially outside said space, and be received before the end of said radiation interval, the periodicity of said suppression of radiant energy transmission being selected so that energy radiated during one radiation interval and received during a subsequent radiation interval will have attenuated sufficiently that modulation components present therein will be below said predetermined level.

2. Apparatus for detecting motion of an intruder in a predetermined limited space, comprising an oscillator for producing an alternating current having a frequency above about 400 megacycles per second, an antenna disposed in said space and arranged to transmit electromagnetic energy supplied thereto from said oscillator and simultaneously to receive said transmitted energy reflected from objects in said space, a transmission line intercoupling said oscillator and said antenna, keying means arranged alternately to permit transmission and to suppress transmission of alternating current to said antenna on said transmission line with a predetermined periodicity, a delay line coupled to said transmission line, said delay line having a length and termination selected to suppress effectively transmission of said alternating current along said transmission line after a selected radiation interval commencing with each transmission permitted by said keying means, detecting means coupled to said transmission line and arranged to detect during said radiation intervals modulation components in electromagnetic energy transmitted from said antenna and reflected from moving objects in said space, and alarm signalling means coupled to said detecting means and arranged to produce an alarm signal upon detection of modulation components of predetermined strength, said radiation interval being selected so that energy transmitted from said antenna during a radiation interval and reflected from an object substantially outside said space will not be returned to said antenna before the end of said radiation interval, said predetermined periodicity being selected so that energy transmitted from said antenna during one radiation interval and returning to said antenna during a subsequent radiation interval will have been attenuated sufficiently that modulation components present therein will not produce an alarm signal.

3. Apparatus as set forth in claim 2 in which said transmission line and said delay line are both coaxial cables.

4. Apparatus as set forth in claim 3 in which said delay line is terminated in a short circuit and is equal in length to an odd integral number of quarter wave lengths at said alternating current frequency.

5. Apparatus as set forth in claim 2 comprising means to attenuate substantially the alternating current in said transmission line after a selected portion of each radiation interval.

6. Apparatus as set forth in claim 5 in which said attenuating means comprises a length of lossy delay line coupled to said transmission line and having a length and termination selected to effect said attenuation at the end of said selected portion of each radiation interval.

7. Apparatus as set forth in claim 2 comprising adjustable means connected to said transmission line to compensate for complex attenuation in said delay line.

8. Apparatus as set forth in claim 2 in which said keying means comprises a length of coaxial cable coupled to said transmission line, an additional oscillator and a rectifier circuit coupling the output of said oscillator to said rectifier circuit, the frequency of said additional oscillator corresponding to said periodicity and the output of said oscillator having a wave form with a steep leading edge, the length of said coaxial cable and said rectifier circuit being arranged so that said transmission line is effectively short circuited for one-half cycle of each cycle of the output of said additional oscillator.

References Cited by the Examiner

UNITED STATES PATENTS

| 2,404,527 | 7/46 | Potapenko | 343—13 |
| 2,408,742 | 10/46 | Eaton | 343—9 |
| 2,442,695 | 6/48 | Koch | 343—17.1 |
| 2,522,367 | 9/50 | Guanella | 343—9 |
| 3,005,194 | 10/61 | Goodell et al. | 343—7.3 |
| 3,008,138 | 11/61 | Berger et al. | 343—7.3 |
| 3,014,215 | 12/61 | MacDonald | 343—17.1 |
| 3,076,191 | 1/63 | Williams | 343—13 |
| 3,079,599 | 2/63 | Caspers | 343—8 |

FOREIGN PATENTS 585,791 2/47 Great Britain.

CHESTER L. JUSTUS, *Primary Examiner.*

BENNETT G. MILLER, NEIL C. READ, *Examiners.*